W. NEWBROUGH.
Churn.
No. 14,677.
Patented April 15, 1856.
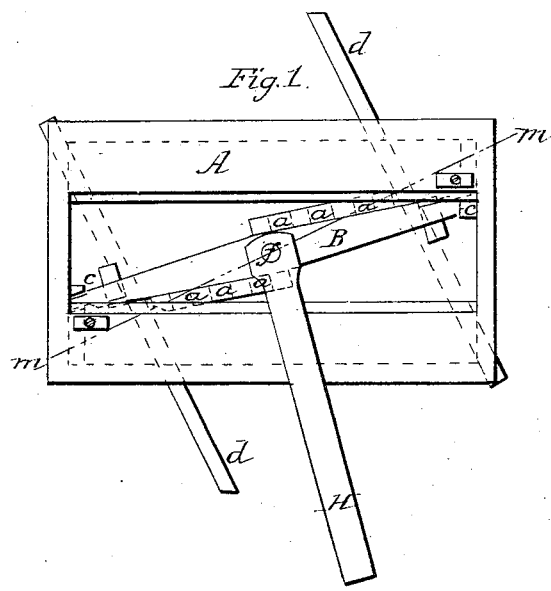
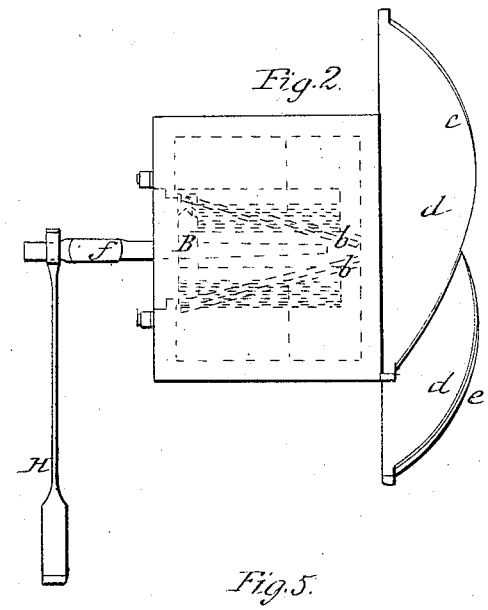
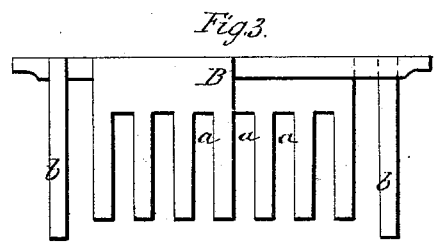
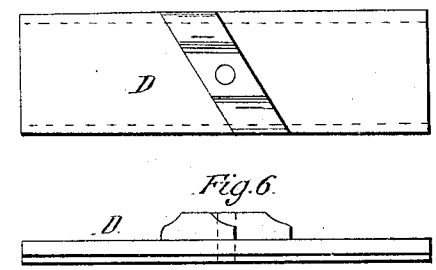

UNITED STATES PATENT OFFICE.

WM. NEWBROUGH, OF MOHICAN, OHIO.

CHURN.

Specification of Letters Patent No. 14,677, dated April 15, 1856.

*To all whom it may concern:*

Be it known that I, WILLIAM NEWBROUGH, of Mohican, in the county of Ashland and State of Ohio, have invented a new and useful Improvement in Churns; and I do hereby declare that the following is a full, clear, and exact description of the construction and operation of the same, reference being had to the annexed drawing, forming part of this specification, in which—

Figure 1 is a plan of the churn. Fig. 2 is an end elevation of the same. Fig. 3 is a side view of the agitator or separator. Fig. 4 is an end view of the same. Fig. 5 is a top view of cover. Fig. 6 is a side view of the same.

Similar letters of reference denote the same part.

My invention consists in the combination of peculiarly shaped rockers placed obliquely under a box churn, with a diagonal separator within the box, constructed and arranged as will be hereafter described, for producing a violent agitation of the cream and speedily converting the same into butter.

To enable others skilled in the art to make and use my invention I will proceed to describe its construction and operation.

In the drawing A represents an oblong box having within it the diagonal separator B formed as shown in Fig. 3, with the openings $a$; it rests in the bearings $c$ and is kept in position by the braces $b$. Obliquely under the box A as shown in Fig. 1 is secured the rockers $d$ $d$, having the form shown in Fig. 2; the swells $e$ being placed on opposite sides of the churn. Vertically through the middle of the separator and through the cover D runs the shaft $f$ to which is attached the elastic handle H. The rockers are placed so that they shall run from alternate corners of the churn bottom and be perpendicular to a line $m$ $m$ shown in Fig. 1.

The operation of my improved churn is as follows.—The box being partially filled with cream the cover is secured, the shaft $f$ inserted and handle H attached. The churn is then rocked from side to side producing a rapid and violent agitation of the cream toward the sides and ends of the box and through the separator, causing thereby a speedy transformation of the cream to butter: the separator serving to catch the particles of butter and assist in the gathering of the same.

The rockers may be placed under any of the ordinary churns and produce a result similar to that above described.

What I claim as my invention and desire to secure by Letters Patent, is—

The combination of the oblique, bulged, rockers with the diagonal separator, for producing a violent agitation of the cream as herein fully set forth.

In testimony whereof, I have hereunto signed my name before two subscribing witnesses.

WM. NEWBROUGH.

Witnesses:
   WILLIAM MILLINGTON,
   JAS. T. MILLIGAN.